Dec. 25, 1962 G. EDLEN ETAL 3,070,649
COAXIAL CABLE COUPLING
Filed June 14, 1960 2 Sheets-Sheet 1
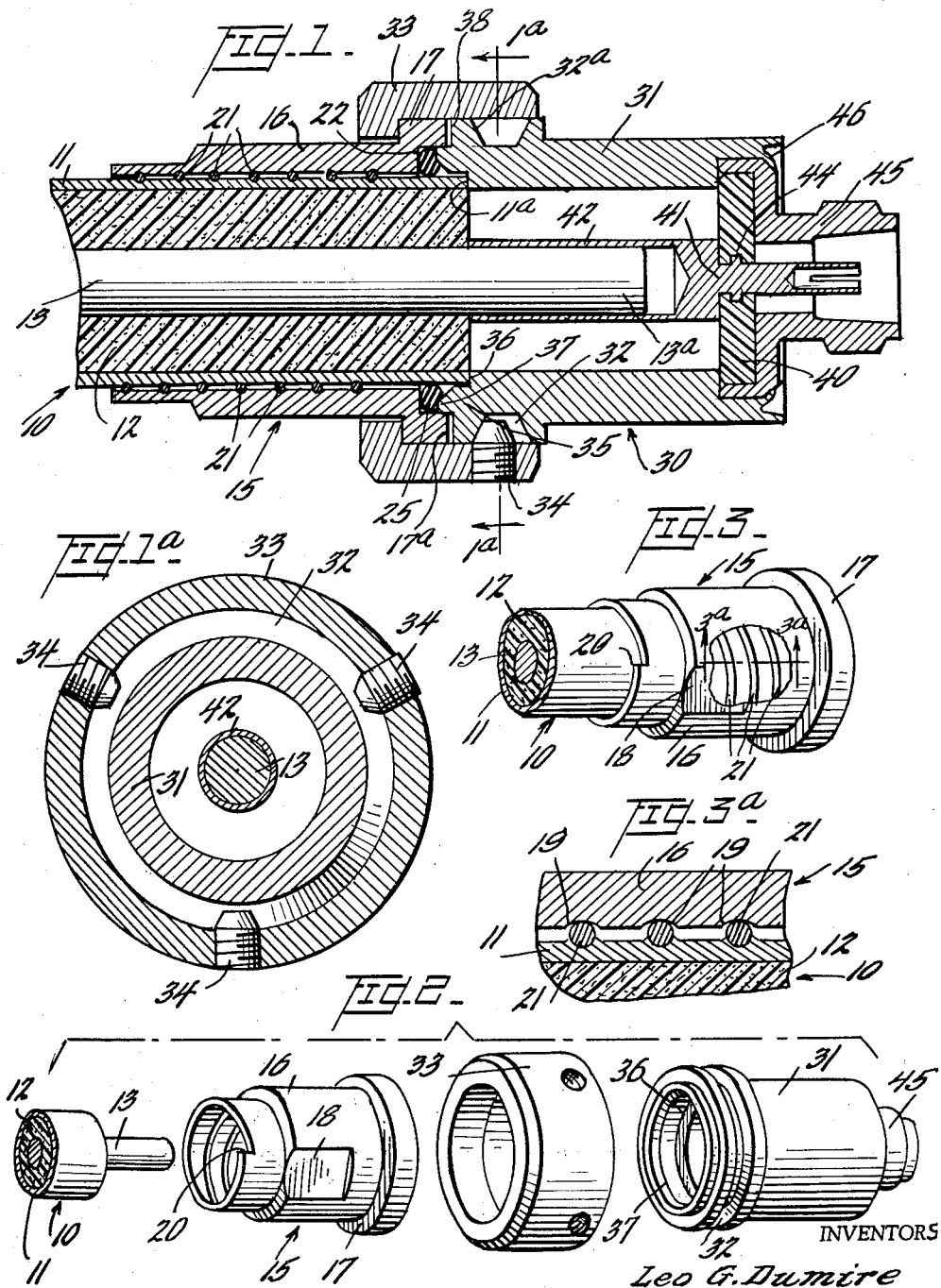
INVENTORS
Leo G. Dumire
George Edlen
BY Paris, Haskell & Levine
ATTORNEYS

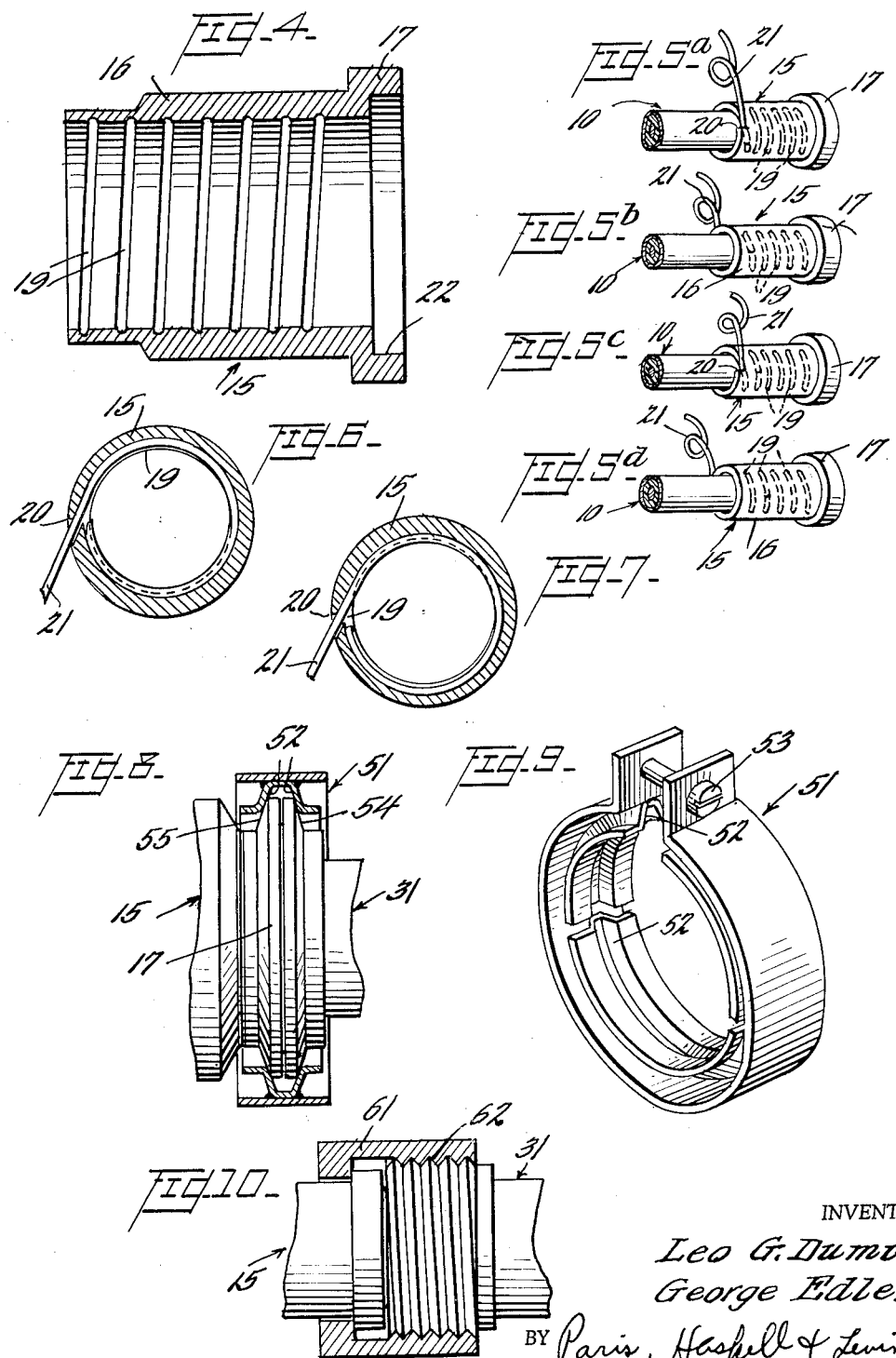

United States Patent Office 3,070,649
Patented Dec. 25, 1962

1

3,070,649
COAXIAL CABLE COUPLING
George Edlen, Bethesda, and Leo G. Dumire, Rockville, Md., assignors to Phelps Dodge Copper Products Corporation, a corporation of Delaware
Filed June 14, 1960, Ser. No. 36,001
4 Claims. (Cl. 174—75)

The present invention relates primarily to electrical cable connectors, and particularly to connectors for coaxial cable. However, the present invention more generally relates to the application of fittings and the like to cables, pipes, tubes, rods, and hose of various types. Additionally, one aspect of the present invention relates to fastenings in general, and particularly to fastenings for deformable materials, such as metals, plastics, elastomers, and the like. This application is a continuation-in-part of the copending application of Leo G. Dumire, George Edlen, and Boris Haskell, filed January 5, 1959, and bearing S.N. 785,025, now U.S. Patent Number 2,983,779, issued May 9, 1961.

In the electrical transmission cable art there has been a considerable growth in the use of coaxial cables. These cables usually take the form of metal jacketed or braided cable. By metal jacketed cable herein is meant a cable comprising a tubular metal sheath or outer conductor, usually formed of copper or aluminum tubing, within which is housed a center or inner conductor, usually a copper wire or rod, the inner conductor being spaced and insulated from the outer tubing by a suitable dielectric. In the specific use of coaxial cable, this inner conductor is centrally and coaxially spaced and supported from the outer tubing sheath, usually either by dielectric glass or plastic beads, a plastic spiral, a foamed plastic, or other dielectric filler. In the case of braided cable, as distinguished from metal jacketed cable, the above-mentioned sheath or outer conductor is a sleeve of braided wire filaments, and usually the braided sleeve is covered with a plastic sheath.

The advent and growth of coaxial cable and analogous shielded conductors has created special problems of installation. It is obviously desirable in the case of either field or bench installations, but particularly the former, that fittings for the cable be readily and easily applied with simple and conventional hand tools, and that mechanically and electrically reliable applications of fittings be attainable with a minimum of skill. Further, particularly in the instance of high frequency installations, it is of utmost importance that changes in the capacitive relationship between the inner and outer conductor be held to a minimum by the application of the fittings.

The present invention is accordingly primarily concerned with fittings for metal jacketed shielded electrical transmission cables, particularly with metal jacketed coaxial cables, and with the mounting or fastening of these fittings on the cable. One aspect of the present invention relates to fastening a sleeve, nut, or the like to the exterior of the cable, by a procedure that is similar to but simpler than a threaded union. Broadly, the sleeve is formed with an internal helical groove or track. The internal diameter of this sleeve upon which the helical groove is formed is slightly greater than the external diameter of the cable sheath to which it is to be applied, so that it may telescope thereover. The end of a wire having a diameter greater than the depth of the groove or track is introduced at a leading terminus of the groove, and the sleeve is then rotated over the cable. Rotation of the sleeve causes the wire to embed in the cable tubing, and as rotation of the sleeve is continued, successive portions of the wire are thus embedded, and form the equivalent of a helical thread over which the groove or track in the sleeve advances, thus forming a union or fastening between the sleeve and cable tubing somewhat analogous to a threaded joint. This sleeve may form an anchoring base for various types of fittings and mountings for pipes, conduits, and hose generally. In the specific case of an electrical cable, once the sleeve is thus anchored to the cable, it may provide the attachment basis for an electrical connector, coupling, or the like, for the cable, adapted to provide separate electrical contact with the outer conductor and with the inner conductor and mating engagement with a corresponding connector part associated with another electrical device.

It is accordingly one object of the present invention to provide a mechanical coupling between a cable, conduit, pipe, tube, or hose and a sleeve applied thereover.

A further object of the present invention is to provide such a coupling having a partially self-forming union between the cable, conduit, pipe, tube, or hose and the sleeve.

Another object of the present invention is to provide an electrical connector employing the foregoing coupling as the basis of union between the connector elements and an electrical cable.

And an additional object of the present invention is to provide a mechanical coupling between a first member having a cylindrical aperture and a second member having a cylindrical surface adapted to be received in said aperture; and further to provide such a coupling which is partially self forming.

Other objects and advantages of the present invention will become apparent to those skilled in the art from a consideration of the following exemplary detailed description of preferred specific embodiments of the invention, this description being had in conjunction with the accompanying drawings in which like numerals refer to like or corresponding parts, and wherein:

FIG. 1 is longitudinal sectional view of a coaxial cable connector embodying the principles of the present invention, and applied to the end of a metal jacketed coaxial cable;

FIG. 1a is a cross-sectional view of the connector taken along the line 1a—1a of FIG. 1;

FIG. 2 is an exploded view of the connector and cable shown in FIG. 1;

FIG. 3 is an enlarged and partially cut-away isometric view of a sleeve anchored to a metal jacketed coaxial cable in accordance with the present invention;

FIG. 3a is an enlarged sectional view of a portion of the sleeve and cable taken along the line 3a—3a of FIG. 3;

FIG. 4 is a longitudinal section of the sleeve shown in FIGS. 1, 2, 3, and 3a;

FIGS. 5A–D are views of the sleeve being anchored to a metal jacketed coaxial cable, shown in successive steps of application;

FIGS. 6 and 7 are transverse sectional views of sleeves employed in the present invention taken along the line of the first convolution of the helical groove in the sleeve, with a wire as employed in the present invention inserted therein;

FIGS. 8 and 10 are each fragmentary and partially sectional views of a portion of a connector applied to a metal jacketed coaxial cable, representing modifications of the embodiment of FIG. 1; and FIG. 9 is a perspective view of a clamping ring used in the modification of FIG. 8.

One important aspect of the present invention resides in the manner of and means for anchoring the sleeve to a cable, pipe, tube, hose, or the like. This is best shown in FIGS. 3, 4, and 5A–D. There is here shown a section of coaxial cable 10 having a metal tubing outer conductor or jacket 11, which may for example be formed of aluminum. A center conductor 13 is coaxially spaced and insulated from the metal tubing or sheath 11 by a foamed plastic dielectric filler 12, for example. The sleeve 15 to be anchored to the cable 10 may preferably be formed of aluminum, if aluminum jacketed cable is used. It has a tubular section 16 and a flange 17 at one end for subsequently described coupling purposes. The sleeve 15 is conveniently provided with flats 18 to facilitate turning the sleeve with a conventional wrench or similar tool, as will subsequently become apparent. Obviously the flats 18 could be formed on the flange portion if desired. A helical groove or track 19 is formed on the inner surface of sleeve 15, and the tubular end is cut back or notched at 20 defining one end or terminus of the groove 19. The other end of this helical groove may terminate blind in the sleeve. The inner diameter of the tubular sleeve is chosen to telescope over the cable 10. With the sleeve 15 partially telescoped over the end of the cable 10, as shown in FIG. 5A, the end of a length of wire 21 is fed into the open end of groove 19, defined by notch 20, and the sleeve is then rotated to advance the groove over the wire. Wire 21 is chosen of a diameter somewhat greater than the depth of the groove 19, and is formed of a material harder than that forming the jacket 11 of the cable, such as stainless steel. Consequently, as the sleeve 15 is rotated, a portion of the diameter of the wire 21 embeds in the cable jacket 11 (see FIG. 1), and the helical groove 19 causes the sleeve 15 to thread over the embedded portions of the wire as the leading portion of the groove causes successive portions of the wire to embed in the cable jacket, as illustrated by the successive stages of application of the sleeve in FIGS. 5A–D, embracing one and one half complete turns of the sleeve. The force required for this operation is substantial, and accordingly the flats 18 facilitate the use of a wrench, or similar tool. When the sleeve has been fully applied to the cable, it will be retained thereon by a desired number of convolutions of the wire 21 whose cross section is partially housed in the convolutions of groove 19 and partially embedded in the cable sheath 11, as shown in FIGS. 1 and 3.

The embedding of the wire 21 in the sheath 11 of cable 10 is obviously most practical when the aluminum sheath 11 is a relatively soft material. It is further apparent that to avoid the necessity for employing an excessive amount of force in threading the sleeve 15 and wire 21 onto the cable 10, the depth of embossment of thread formed on the cable by embedment of the wire 21 should not be great. This criterion is further magnified in the case of coaxial cable, since it is important that the internal diameter of the sheath or outer conductor 11 not be significantly affected by application of the anchor sleeve 15, since that would alter the electrical relation between the inner and outer conductors 13 and 11 of the cable and thereby adversely affect the electrical properties of the cable. Accordingly, as shown in the enlarged fragmentary cross sectional view of FIG. 3a, the degree of embedment of the wire 21 into the cable sheath 11 is only a minor portion of the diameter of the wire.

Although the requirement of only a small degree of embedment of the wire in the sheath is dictated by the foregoing factors, the resultant union between the cable 10 and the anchor sleeve 15 is thereby rendered relatively weak with respect to an axial stress applied to the sleeve relative to the cable, since the wire convolutions 21 may rather readily shave along the relatively soft material of aluminum sheath 11, thereby either axially loosening the union between the sleeve and cable, or completely stripping the sleeve from the cable.

The foregoing difficulty is overcome in the illustrated specific embodiment, particularly FIG. 3a, by forming the helical groove 19 with a surface contour having a cross-sectional radius of curvature substantially greater than the cross-sectional radius of the circular wire 21. With such a relation, it is apparent that upon axial pull of sleeve 15 relative to cable 10, the force acting at the interface of the helical groove 19 and the wire 21, provides a much greater radial or compressional vector on the convolutions of wire 21 and a much lesser axial stripping vector, relative to the cable 10, than would be had if the radius of curvatures of the helical groove 19 and the cross-sectional radius of the wire 21 were approximately equal. As a result, with the foregoing relationship between wire and groove, axial stresses between the cable and sleeve tend to cause the wire to bite into the cable more than to strip along the cable. There is thereby provided a very secure joint between the sleeve 15 and cable 10, exceptionally resistive to axial stress or pull. Since there are a substantial number of convolutions of the wire 21, the radial compressional forces thus acting on the convolutions of the wire are distributed over a substantial area of the cable; thus, even a very large axial force on the sleeve 15 does not cause any substantial radial deformation of the internal surface of the cable sheath 11.

The foregoing effect is obtained in the specific embodiment by forming the surface of the helical groove 19 with a cross-sectional arc having a radius of curvature substantially greater than that of the wire 21. The groove 19 thus contacts the wire 21 only in the area immediately adjacent the line of maximum penetration of the wire into the groove. However, the arcuate shape for groove 19 is chosen primarily as a manufacturing expedient, and it is apparent that the cross-section of groove 19 need not be arcuate. Substantially the same effect may be had for example with a wide angle V cross-section groove. For a symmetrical groove, the angle of the V is preferably substantially greater than 90°. The primary criterion is that the surface of groove 19 have a cross-sectional configuration related to the cross-sectional configuration of the wire 21 so as to exert a substantially greater radial force on the convolutions of the wire than an axial stripping force, upon application of an axial stress between the cable 10 and sleeve 15.

It has been found that a very effective relationship between arcuate groove 19 and circular wire 21 is one wherein the cross-sectional radius of curvature of the groove 19 is about twice the cross-sectional radius of the wire 21.

It is preferred that some expedient be provided for starting the embedment of the wire on the pipe hose, tube, or cable to which the sleeve is to be anchored. Two such expedients are suggested herein: one being to flare the leading one of the helical groove 19, i.e. gradually to increase at least the depth of the first groove convolution toward the wire feed in end adjacent notch 20 so that the wire gradually emerges from the groove proceeding inwardly of the convolution; and the other being to taper that end of the wire first inserted into the groove 19 through the feed in notch 20. These expedients are illustrated in FIGS. 6 and 7, respectively, which are each sectional views of a sleeve as cut along the line of the first groove convolution, with the wire inserted.

FIG. 6 illustrates the form of the sleeve groove in which the first convolution is spiralled, that is, starting with the feed in notch 20, the groove 19 in the sleeve 15 has a depth greater than the diameter of the wire 21. Proceeding down or inwardly of the groove, its depth is tapered to a lesser and lesser dimension, until the wire diameter is greater than the depth of the groove and the wire protrudes therefrom so that it can be embedded in the tube, or the like, to which the sleeve is being applied. It can thus be seen that this spiral convolution provides an opportunity for the wire to wedge between the sleeve and tube or rod, to grab, and thus facilitate the embedding operation which results from further rotation of the sleeve.

FIG. 7 illustrates the expedient in which the end of the wire is tapered. Here, the first convolution of the groove 19 in sleeve 15, starting with the wire feed in notch 20, may be of uniform depth, and may also have the same depth as the remaining convolutions of the sleeve. The lead in end of the wire 21 is tapered, so that when the sleeve 15 is first partially telescoped over the end of a tube or rod, or the like, the tapered end of wire 21 can be readily inserted at the feed in notch 20 into the first convolution of groove 19 for at least a portion of the convolution. By this means, when the tapered end of the wire is inserted in the groove, the projection of the wire from the groove is tapered near the leading end of the wire, so that the wire will wedge and grab against the tube or rod to which the sleeve is being anchored when the sleeve is rotated to embed the wire in the tube or rod.

Of course, the features of tapered wire and spiralled groove could be combined where desired, and whichever form is utilized, it is also desirable to serrate the internal surface of the wire at least along the first feed in convolution, or along its entire length, to facilitate a grab between the rod, cable sheath, or tubing to which it is being applied. These serrations effect a stronger grab between the wire and tube or cable to which it is being applied during the process of rotating the sleeve 15 onto the rod, tube, or cable.

Although the wire 21 as shown in the drawings is circular in cross-section, it is understood that the invention is not limited thereto, and wires of other cross-sectional configurations can be employed. Whatever cross-sectional configuration is employed for the wire 21, the same considerations for starting the wire feed in, and for camming the wire convolutions radially in response to axial stresses applied to sleeve 15, will apply.

Referring to FIGS. 1, 1a, and 2, there is shown an exemplary coaxial cable connector 30 applied to coaxial cable 10, which connector embodies the foregoing principles of the present invention, as well as additional features hereinafter described. The connector 30 comprises anchoring sleeve 15, which is applied and anchored to the cable by means of wire 21, in the manner aforedescribed with particular reference to FIGS. 3, 3a, 4, and 5. As previously described, the anchoring sleeve 15 comprises the tubular portion 16 cooperating with the wire 21, and at its forward end adjacent the end of the cable is provided with circumferential exterior flange 17. A recessed, forwardly opening, internal, circumferential seat 22 is formed interiorly of the flange 17, for receiving a resilient sealing member, such as O-ring 25.

An adapter member contained by housing 31 is affixed to the end of the cable 10 by means of the anchoring sleeve 15, as will be subsequently described. Within the housing 31, the adapter includes a center contact element 41, coaxially mounted within the housing 31 by annular dielectric button 40 and the protuberances 44 extending radially from the contact element 41 and embedded in the button 40. On one side of the button 40, the center contact 41 is formed as an elongate tubular socket 42 adapted to receive and make electrical contact with the end 13a of the cable center conductor 13. On the other side of the button 40, the center contact is similarly formed at 43 to receive the center conductor of a coaxial terminal to which the cable 10 is to be connected. A cooperating outer contact member 45 is positioned circumferentially about and coaxially spaced from center contact portion 43, adapted to connect with the outer conductor of the coaxial terminal to which the cable 10 is to be connected. Outer contact 45 may conveniently be retained in the housing 31 by rolling over a retaining lip 46 formed on the housing. In the specific assembly shown, it can be seen that the button 40 is retained in position by being sandwiched between an internal shoulder in the housing 31 and the outer contact element 45.

The rear end-face of housing 31 is formed with a stepped configuration adapted to mate with the forward end-face of the anchoring sleeve 15 and abut the forward end 11a of the cable outer conductor or sheath 11. To this end, the rear end-face of housing 31 is formed with a first annular end-face portion 38 conforming substantially to the forward annular end-face 17a of the flange 17 on the anchoring sleeve, and a second annular end-face portion 36, located radially inwardly of the first end-face portion 38, is adapted to abut the forward end 11a of the cable outer conductor. Between the two annular end-face portions 36 and 38, an annular axially protruding lip 37 is provided, adapted to enter the annular recess 22 internally of flange 17 in sleeve 15, and to compress O-ring 25, thereby causing the O-ring to effect an annular seal between the cooperating portions of anchor sleeve 15, adapter housing 31, and cable outer conductor 11, and preventing moisture from entering and accumulating internally of the adapter housing.

The adapter housing 31 is attached to cable 11 by means of anchoring sleeve 15. An internally shouldered ring 33 is formed to abut the back face of flange 17 and extend forwardly over the flange and over a portion of housing 31. A radially tapered circumferential groove 32 is formed in that portion of housing 31 embraced by ring 33. The ring is radially tapped at a plurality of circumferentially spaced points to receive camming screws 34 (three shown), whose inner ends are frusto-conical with a taper conforming substantially to the taper on the rear wall 32a of groove 32. Thus, when the screws 34 are threaded into their tapped holes in ring 33, the engagement of the conical ends of the screws with the wall 32a of groove 32 cams ring 33 forward and housing 31 rearward, bringing annular end-face portion 36 into forced abutment with the end 11a of the cable outer conductor, and causing annular protuberance or lip 36 to compress O-ring 25. It is preferred that a slight clearance remain between faces 38 and 17a after assembly of the connector 30 to the cable 10, in order to insure good electrical contact between face 36 of the adapter housing and end 11a of the cable outer conductor.

In applying the present connector 30 to cable 10, the cable is first trimmed by cutting away an end portion of the outer conductor 11 and a corresponding portion of the dielectric 12, leaving a squared or flat leading end, and leaving a prescribed length 13a of the center conductor protruding therefrom. Ring 33 is then slipped over the cable 10, and the anchoring sleeve 15 is applied to the end of the cable by means of wire 21 until the trimmed end of the outer conductor 11 protrudes from the forward end of the sleeve a small prescribed distance. O-ring 25 is slipped over the end of the cable and seated in the recess 22. The adapter housing 31 is thereafter brought into position over the small protruding portion of the cable, the ring 33 is brought forward to place its internal shoulder in abutment with the back of flange 17, and the screws 34 are threaded into the slot 32 to cam the ring 33 and housing 31 toward each other, thereby completing the assembly of the connector to the cable when annular end-face portion 36 is force abutted against the end 11a of the cable outer conductor.

Electrical connection is effected from the outer conductor 11 of cable 10 through the adapter housing 31 to the outer connector element 45, and from the inner conductor 13 of cable 10 through the center contact element 41 to the inner connector element 43. The inner and outer connector elements 43 and 45 may be of various sizes and designs adapted to mate and form electrical and mechanical connection with corresponding inner and outer connector parts associated with the device, system, or cable to which cable 10 is to be connected.

For purposes of illustration, the cable 10 is shown as containing a foamed plastic dielectric 12. Other forms of dielectric center conductor supports for metal jacketed coaxial cable are known and prevalently used. For example, the dielectric support may comprise laminations of polystyrene helically wound on the center conductor 13. In such instance, since a major portion of the dielectric is air or gas, the cables must be gassed to uniform pressures after application of the connector in order to maintain uniform electrical characteristics and prevent changes in the gas content and hence in its dielectric constant. For this purpose a port and valve (not shown) may be provided in the wall of adapter housing 31 at any convenient desired location rearwardly of button 40. In such instance, of course, the O-ring 25 functions as a gas seal to render the union of the connector 30 with the cable 10 gas tight.

A reliable gas and vapor seal is an important feature of the present invention. It should, therefore, be specifically noted that the O-ring 25 is applied in an exposed seat, to be sure that it is properly located in its seat 22 prior to application of the adapter housing 31 and is not damaged in being slipped over the trimmed end of cable 10. Additionally, the camming action of screws 34 in groove 32 effects only axial movement of the adapter housing 31 relative to the cable, and no significant relative angular movement is had therebetween which would be likely to grab the O-ring and distort or damage it to render it ineffective as a gas or vapor seal.

The flange 17, shouldered ring 33, camming screws 34, and cam groove 32 together function to provide one means for effecting a mechanical union between the cable 10 and adapter housing 31 by relative axial movement without relative angular movement. An alternative embodiment is shown in FIGS. 8 and 9, wherein the adapter housing 31 and flange 17 are formed with oppositely tapered outer surfaces 54 and 55, cooperating with clamp ring 51 having a mating taper 52. The clamp ring is adapted when applied over the tapered surfaces 54 and 55 to draw the cable 10 and adapter housing 31 toward each other axially when the ring 51 is reduced in circumference by tightening of screw 53.

Still another embodiment for uniting the cable and adapter is shown in FIG. 10, wherein an internally shouldered nut 61 replaces ring 33 of FIG. 1, and a threaded union is effected between the nut 61 and the adapter housing 31 at 62. Thus, when the nut 61 is threaded on to the adapter, it draws the adapter housing 31 and the cable axially toward each other.

Having thus presented several specific embodiments of the present invention, it will be appreciated that the invention embodies a novel means for anchoring a connector to a coaxial cable, and further embodies a novel combination of coaxial cable and connector employing this anchoring means. In its more general aspects, the invention provides a novel means for anchoring a fitting or the like to any cable, pipe, rod, tube, or hose whose outer surface is deformable; and broadly it provides a novel union for two telescopically related tubular surfaces. The specific examples are presented solely as exemplary of the invention in order to facilitate a complete understanding thereof. Since numerous variations and modifications will be apparent to those skilled in the art, it is apparent that the invention is not limited to the disclosed specific embodiments, and such modifications and variations as are embraced by the spirit and scope of the appended claims are contemplated as within the purview of the present invention.

What is claimed is:

1. In combination, an electrical cable having a first conductor, a second conductor surrounding said first conductor, said second conductor being a solid walled tube formed of a malleable metal and having substantial resistance to compressive forces, and insulation means supporting said first conductor in spaced relation to said second conductor interiorly thereof, and an end connector for said cable comprising, a sleeve telescoped over an end portion of said second conductor and having a substantially helical groove defined on the interior surface thereof, a wire having a cross-sectional dimension greater than the depth of at least a portion of said groove partially housed in said groove and partially embedded in said second conductor to anchor said sleeve to said second conductor, an annular contact means having an end face located in opposed relation to the end of said second conductor and the corresponding end of said sleeve, a first portion of said end face being located radially inwardly of said sleeve and wire and in butting axial thrust engagement with the terminal end of said end portion of said second conductor in an area located radially inwardly of said sleeve and wire in force transmissive relation to said second conductor axially thereof, a second portion of said end face located radially outwardly of said second conductor and protruding axially beyond said first portion and telescoping over the terminal section of said second conductor, said end of said sleeve having an annular recess formed in the internal surface and said end of said sleeve receiving said second portion of said end face axially therein, a compressible gasket seated in said annular recess over said terminal section of said second conductor, said end face being axially spaced from said end of said sleeve, a second contact means in electrical contact with said first conductor, means supporting said second contact means in spaced relation to said annular contact means, and means engaging both said sleeve and said annular contact means forcing said sleeve and annular contact means toward each other and placing said end portion of said second conductor in an area radially inward of said sleeve and wire under axial compression against said first portion of said end face and thereby providing a bearing placing the union between said sleeve and second conductor under axial tension in response to transmission axially along said second conductor of the compressional force between said terminal end of said end portion of said second conductor and said first portion of said end face, and placing said gasket under sealing compression between said second conductor, said end of said sleeve, and said second portion of said end face of said annular contact means, said two contact means being further formed to provide electrical contact with an electrical conducting device, whereby said two contact means may provide an electrical connection between an end of said cable and said conducting device.

2. An electrical connector as set forth in claim 1, wherein said sleeve has an external flange, said sleeve and annular contact engaging means is a ring having an internal shoulder abutting said flange, said ring extending over said flange and a portion of said annular contact means, said portion of said annular contact means having an external tapered side slot therein, a plurality of screws radially carried by said ring entering said slot and cooperate with said tapered side to cam said contact means toward said cable and sleeve.

3. An electrical connector as set forth in claim 1, wherein said sleeve has an external flange, said sleeve and annular contact engaging means is an internally shouldered and internally threaded nut abutting said flange and extending over said flange and a portion of said annular contact means, said portion of said annular contact means being externally threaded and cooperating with said nut to draw said contact means toward said cable and sleeve.

4. An electrical connector as set forth in claim 1, wherein said sleeve has an external flange, said annular contact means has an external flange, and said sleeve and annular contact engaging means is a clamping ring embracing said two flanges, at least one interface between said ring and flanges being radially tapered to draw said contact means toward said cable and sleeve upon circumferential closure of said clamping ring.

References Cited in the file of this patent

UNITED STATES PATENTS

| | | |
|---|---|---|
| 2,038,867 | Wilson | Apr. 28, 1936 |
| 2,052,394 | Fullman | Aug. 25, 1936 |
| 2,118,672 | Green | May 24, 1938 |
| 2,258,737 | Brown | Oct. 14, 1941 |
| 2,738,207 | Twigg | Mar. 13, 1956 |
| 2,937,893 | Hill et al. | May 24, 1960 |
| 2,983,779 | Dumire et al. | May 9, 1961 |

OTHER REFERENCES

Publication I, "Spir-O-Line Connector," advertisement of Prodelin Inc. (1 page). Copy received in Division 65 on June 5, 1958.